UNITED STATES PATENT OFFICE.

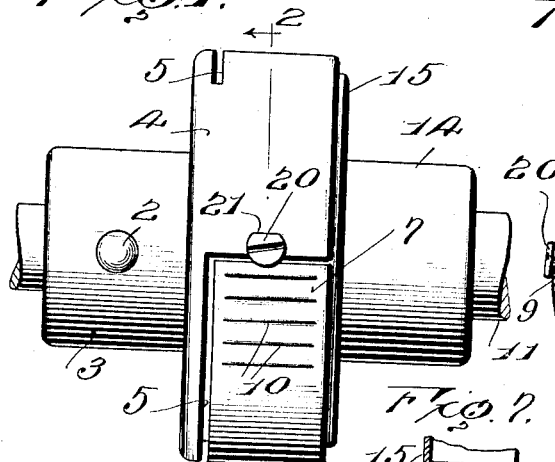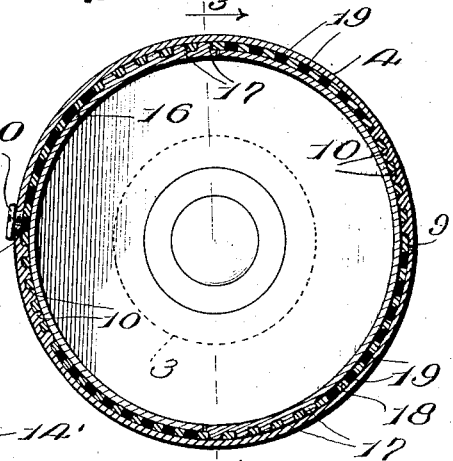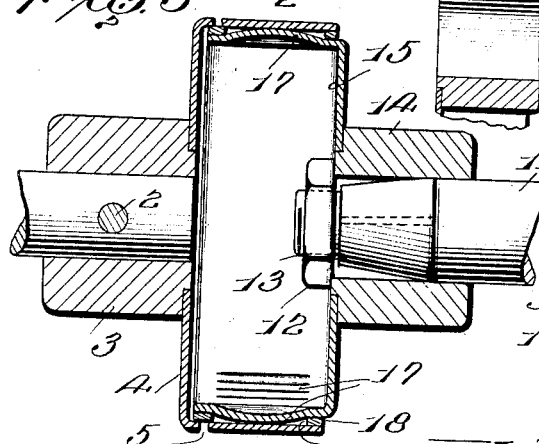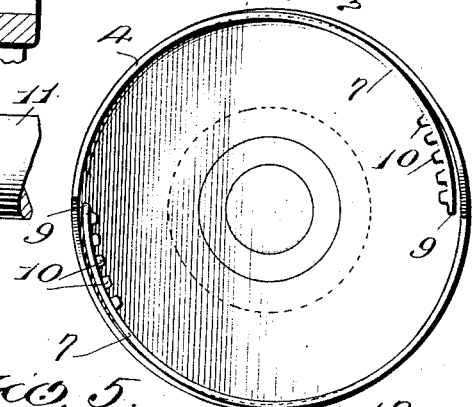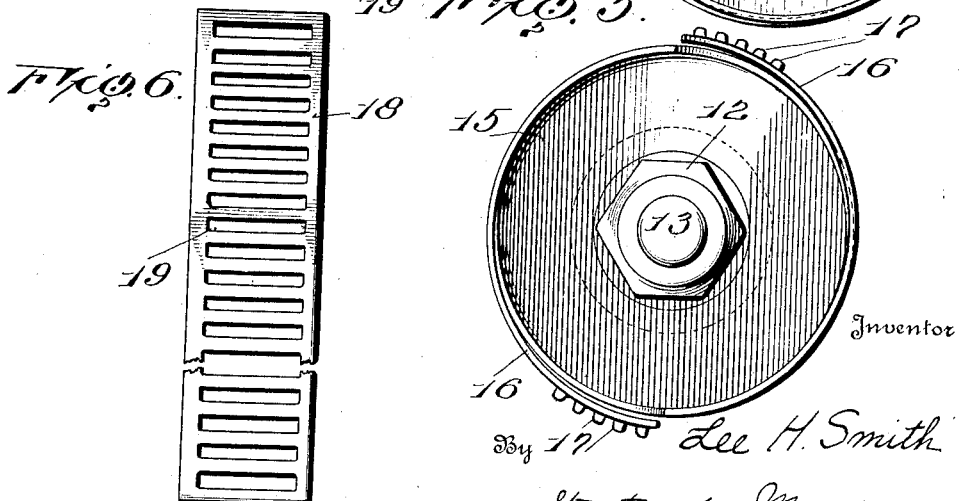

LEE H. SMITH, OF SEDAN, KANSAS.

FLEXIBLE COUPLING FOR MAGNETOS.

1,383,160.   Specification of Letters Patent.   Patented June 28, 1921.

Application filed December 14, 1920. Serial No. 430,614.

*To all whom it may concern:*

Be it known that I, LEE H. SMITH, a citizen of the United States, residing at Sedan, in the county of Chautauqua, State of Kansas, have invented certain new and useful Improvements in Flexible Couplings for Magnetos, of which the following is a description, reference being had to the accompanying drawing, and to the figures of reference marked thereon.

This invention relates to shaft couplings, and more particularly to a flexible shaft coupling for driving a magneto or generator from the usual engine shaft.

The main object of this invention is to provide a flexible driving connection between two shafts, and particularly between the power shaft of a gas engine and the shaft of a magneto, which will permit a certain amount of flexible disalinement of these shafts and which will also permit the ready angular displacement of one shaft relative to the other without disturbing the fixed position of the magneto.

A further object of this invention is to provide a flexible coupling of the character described which is noiseless and in which the wear on parts is reduced to a minimum and automatically compensated for.

Still another feature of this invention is to provide a coupling of few parts and simple construction arranged so that the magneto shaft may be readily adjusted without the necessity of moving or loosening the magneto from its location on the engine.

A still further object of this invention is to provide a means for sealing the adjustment of the coupling parts to prevent unauthorized and ignorant tampering therewith.

These and other objects will in part be obvious and will in part be hereinafter more fully disclosed.

Referring more particularly to the accompanying drawings:—

Figure 1 is a perspective view of the preferred form of my coupling;

Fig. 2 is a section on the line 2—2 of Fig. 1 looking in the direction of the arrows;

Fig. 3 is a section of Fig. 1 taken at right angles to Fig. 2;

Fig. 4 is an inside view of the outer shell member;

Fig. 5 is a perspective view of the inner shell member;

Fig. 6 is a broken perspective view of the floating connecting ring, and

Fig. 7 is a detail view showing the modified manner of connecting one of the shafts to one of the shell members.

In general, the invention comprises two circular shell members of spring steel connected to opposed alined shafts and arranged so that one shell nests within the other. Each shell is provided with one or more resilient arms preferably integral with the shell and formed with a plurality of projecting studs. These arms on the inner shell member are sprung slightly outwardly, while those on the outer member are sprung slightly inwardly. Between these shells is arranged an independent ring or shell provided with spaced perforations to receive the outwardly projecting studs on the inner shell member and likewise to receive the inwardly projecting studs on the outside shell member. In this manner, the independent ring locks the two shell members in fixed position, from which position they may be readily adjusted relatively by springing the arms of the outer shell out of their locking engagement with the ring perforations and moving them angularly with respect to the ring and then permitting the arms to snap into the new locking position.

Referring now more particularly to the accompanying drawings, the shaft 1 has fixed thereto as at 2 by a pin or other coupling, the hub 3 of any desired shape or size, carrying an outer shell member 4, preferably circular in shape, although it is within the contemplation of this invention to form this shell as a multisided member, such as an octagonal outer member. This outer shell 4, which preferably is a fabricated stamping, is of such a composition that it will mildly temper, and when so tempered will possess a certain amount of resiliency. One or more portions at points diametrical or otherwise are cut in this outer shell as by means of a peripheral slot 5 joined by a transverse slot 6 to provide a resilient wing or wings 7, which in the case of the outer shell, are bent inwardly as at 8 (Fig. 4) to provide a resilient connection, as hereinafter described. Preferably in the free ends 9 of these wings are formed one or more inwardly projecting studs or lugs 10. These studs or serrations 10 are made by cutting and stretching the metal out of and through the main body of the wing a distance equal to the thickness of the material, but not cutting it at the ends of the serrations. In some instances, instead of slitting the metal between these ends and forcing it inwardly as above described to provide well defined engaging shoulders, it is quite possible that these transverse ribs or serrations may be made by flowing the metal in to provide these square shoulders. Fixed to the opposite alined shaft 11 as by means of a nut 12 on the threaded end 13 thereof is a hub 14 to which the inner shaft member 15 is connected. This shell member is sufficiently smaller than the outer shell to permit the inserted shell or floating ring to enter freely when nested therebetween. Otherwise the inner shell is made identically the same as the outer shell member with the exception that the resilient wings 16 are given an outward bend and the serrations 17 thereof are projected outwardly. This inner shell 15 is slightly smaller in diameter than the outer shell into which it nests. Arranged between the circumferential outer face of the inner shell 15 and the circumferential outer face of the outer shell 4 is an independent locking or floating circular shell 18 provided with a series of spaced slots or indentures 19 extending all the way through the ring. As shown, these slots are spaced at equal intervals around the circumference of the shell and are arranged so that the width of the holes 19 and the metal between them are approximately equal and represent the minimum circular degree range of setting for the coupling which in construction can be made small enough for all practical usage.

In assembling the coupling, the floating ring 18 is forced inside the outer shell 4 and the projections 7 thereof snap into the slots 19 in the ring and the wings 7 exert a spring tension inwardly on the ring 18. The inner shell 15 with its shaft 11 is then forced inside of the ring 18 with the ends of the wings 16 approximately ninety degrees from the ends of the wings 7 of the outer shell. These serrations 17 on the inner shell likewise snap into the slots 19 on the circular ring and these wings exert a spring tension outwardly. Thus the floating ring 18 is held between the outer and inner pressures and cannot rattle or come out of the assembled structure, and the resilient wings 7 and 16 being free and flexible, automatically give and take up any misalinement of the shafts of the coupling. It will be particularly noticed that there will be enough clearance between the inner and outer shells to permit slight lateral movement therebetween, and any looseness due to this clearance, is taken up by spring arms to thus prevent rattling. To change and properly set the spark timing, it is merely necessary to spring the wings of the outer shell outward until the serrations 10 thereof clear the slots 19 of the floating ring and then turn the magneto shaft and this half of the coupling the proper amount and direction and then let the serrations snap back into the corresponding slots 19 in the floating ring.

To prevent tampering with the coupling setting, a screw 20, shown in Fig. 1, can be optionally provided. The head of this screw extends across the transverse slot 6 which forms the free end of the wing, and over the free end thereof, thus preventing the wing from being lifted. By soldering or waxing the screw in place, the coupling is effectively sealed. For convenience in expeditious adjustment, part of the head of the screw, as at 21, is cut away so that the screw need only be turned a part of a revolution to allow the adjustment of the magneto.

Fig. 7 shows a sectional view of one of the shell members, say 15, and the manner of mounting it in reversed position to one of the hub members 14'.

While it is obviously within the contemplation of this invention to include a construction not involving the intermediate floating ring, the preferred form includes such member. It is also understood that it is not intended to limit the invention to shells, but the outer and inner members may be of any construction permitting the function of a flexible connection of the manner described.

It is obvious that minor changes in the details of construction and the arrangement of parts may be made without departing from the spirit of the invention as set forth in the appended claims.

Having thus described the invention, what I claim as new and desire to secure by Letters-Patent, is—

1. The combination of a pair of alined shafts, a spring metal shell fixed to one of said shafts, a spring metal shell connected to said other shaft and nesting within said first shell, and means resiliently connecting said shells and forming a flexible driving connection therebetween, said means permitting the relative angular adjustment of said members.

2. The combination of a pair of alined shafts, a spring metal shell fixed to one shaft, a spring metal shell connected to said other shaft and nesting within said first shell, a spring metal shell floatingly mounted between said shells and resilient means for locking said shells in driving position, said means permitting the relative angular adjustment of said shells.

3. In combination, alined driving shafts, a recessed member connected to one shaft, a second member connected to the other shaft and nesting within said recessed member, an independent member between said inner and outer members, and means forming a driving connection between said members and independent member while permitting a limited lateral movement of said members relatively, said means permitting the relative rotary adjustment of said members.

4. In combination, a shaft, an outer shell connected therewith having a suitable number of resilient inwardly projecting wings, a second shaft, an inner shell connected thereto, nesting within said outer shell and having a suitable number of resilient outwardly projecting wings, and an independent ring arranged between said shells and adapted to be engaged by said wings to provide a driving connection between said shafts.

5. In combination, a shaft, an outer shell connected therewith having a suitable number of resilient inwardly projecting wings, a second shaft, an inner shell connected thereto, nesting within said outer shell and having a suitable number of resilient outwardly projecting wings, an independent ring arranged between said shells and adapted to be engaged by said wings to provide a driving connection between said shafts, and means whereby said wings may engage said shell in various positions of angular adjustment.

6. In combination, a shaft, a spring metal shell connected thereto, and slotted at a suitable number of places to provide a suitable number of inwardly pressing wings, the inner portion of said wings being formed with a suitable number of locking projections, a second shaft, a spring metal shell connected thereto and nesting within said outer shell, said inner shell being slotted at desired points to provide a suitable number of outwardly pressing wings formed on their free ends with outwardly projecting locking projections, and an independent ring arranged between said inner and outer shell members and provided with spaced recesses to receive the projections of said wing members.

7. In combination, a shaft, a spring metal outer shell connected thereto and provided with a plurality of slotted portions forming integral wings having free ends curved inwardly and spirally to exert a spring tension inwardly, the free ends of said wings being formed with inwardly projecting locking members, a second shaft, an inner spring metal shell nesting within the same and suitably slotted to provide a plurality of resilient wings curved outwardly and spirally to exert an outward spring tension, said wings likewise having a suitable number of outwardly projecting locking members, and an independent ring fitting within said inner and outer shell members and formed with a plurality of circumferential recesses to receive said locking members.

8. In combination, a shaft, an outer spring metal shell connected thereto, provided with a plurality of integral inwardly projecting spring wings, said wings being formed on their free ends with the desired number of inwardly projecting locking lugs formed by slitting the metal of the wings transversely of its lateral sides, and punching the same inwardly, a second shaft, an inner shell connected therewith and nesting within the outer shell, and formed with the desired number of integral resilient wings provided with outwardly projecting locking lugs circularly formed, and a floating ring member formed with spaced slots fitting within the inner and outer shell members and adapted to receive the locking projections thereof.

9. In combination, a shaft, an outer shell suitably slotted to provide a resilient inwardly pressing wing provided with a free end formed with a suitable number of inwardly projecting locking lugs, a second shaft, an inner shell nesting within the same and formed with a plurality of outwardly and projecting resilient wings provided with a plurality of outwardly facing locking lugs, an independent ring arranged between said shell members and provided with spaced recesses for receiving said projections, and a locking screw attached to said outer shell member and arranged with respect to the free end of said inwardly projecting resilient wing so that the head of the screw will lie across the free end of the wing and prevent its outward displacement.

10. In combination, a shaft, an outer shell suitably slotted to provide a resilient inwardly pressing wing provided with a free end formed with a suitable number of inwardly projecting locking lugs, a second shaft, an inner shell nesting within the same and formed with a plurality of outwardly projecting resilient wings provided with a plurality of outwardly facing locking lugs, an independent ring arranged between said shell members and provided with spaced recesses for receiving said projections, and a locking screw attached to said outer shell member and arranged with respect to the free end of said inwardly projecting resilient wing so that the head of the screw will lie across the free end of the wing and prevent its outward displacement, said screw having a cut away portion so that upon the partial turning of the screw, said cut away portion will clear the end of the wing whereby said wing may be forced outwardly.

In testimony whereof, I affix my signature.

LEE H. SMITH.